US008276718B2

(12) United States Patent
Bach et al.

(10) Patent No.: US 8,276,718 B2
(45) Date of Patent: Oct. 2, 2012

(54) DISK BRAKE

(75) Inventors: Uwe Bach, Niedernhausen (DE); Stefan Heinz, Eppstein (DE); Peter Bogenschütz, Wedemark (DE); Ahmed Sefo, Frankfurt/M (DE)

(73) Assignee: Continental Teves AG & Co. oHG (DE)

( * ) Notice: Subject to any disclaimer, the term of this patent is extended or adjusted under 35 U.S.C. 154(b) by 430 days.

(21) Appl. No.: 12/514,878

(22) PCT Filed: Oct. 10, 2007

(86) PCT No.: PCT/EP2007/060740
§ 371 (c)(1),
(2), (4) Date: Dec. 11, 2009

(87) PCT Pub. No.: WO2008/061841
PCT Pub. Date: May 29, 2008

(65) Prior Publication Data
US 2010/0163350 A1   Jul. 1, 2010

(30) Foreign Application Priority Data

Nov. 23, 2006 (DE) .......................... 10 2006 055 717
Jul. 17, 2007 (DE) .......................... 10 2007 033 165

(51) Int. Cl.
*F16D 65/02* (2006.01)
(52) U.S. Cl. .................... 188/73.43; 188/71.1
(58) Field of Classification Search ................. 188/71.1, 188/72.5, 73.43, 73.47; D12/80
See application file for complete search history.

(56) References Cited

U.S. PATENT DOCUMENTS

| 6,708,802 B2 | 3/2004 | Stahl et al. |
| 2005/0173205 A1 | 8/2005 | Bach et al. |
| 2005/0194222 A1 | 9/2005 | Stickney et al. |
| 2006/0076198 A1* | 4/2006 | Thiel .......................... 188/73.43 |

FOREIGN PATENT DOCUMENTS

| DE | 3925587 A1 * | 2/1991 |
| DE | 41 01 514 A1 | 7/1992 |
| DE | 100 27 783 A1 | 1/2002 |
| DE | 10 2004 043 307 A1 | 6/2005 |
| EP | 1 143 163 A2 | 10/2001 |
| EP | 1 227 260 A2 | 7/2002 |
| WO | WO 03/095860 A1 | 11/2003 |
| WO | WO 2007/131922 A1 | 11/2007 |

\* cited by examiner

*Primary Examiner* — Robert A Siconolfi
*Assistant Examiner* — Anna Momper
(74) *Attorney, Agent, or Firm* — RatnerPrestia

(57) ABSTRACT

A disk brake having a brake disk, a brake caliper including a bracket, a caliper housing and a brake lining. The bracket and the caliper housing engage axially around the brake disk, with the caliper housing and the brake lining movable in an axial direction. The caliper housing has outer housing limb comprising two housing fingers which run substantially in a radial direction and which span a limb window situated between them and which is open in the direction of the rotational axis, with the housing fingers having one end section facing the rotational axis. A protective screen covers end sections of the housing fingers and conceals a section of the limb window that faces the rotational axis, with an outer dimension of the protective screen in a circumferential direction such that a transition between the protective screen and the housing fingers is substantially stepless in an axial projection.

11 Claims, 4 Drawing Sheets

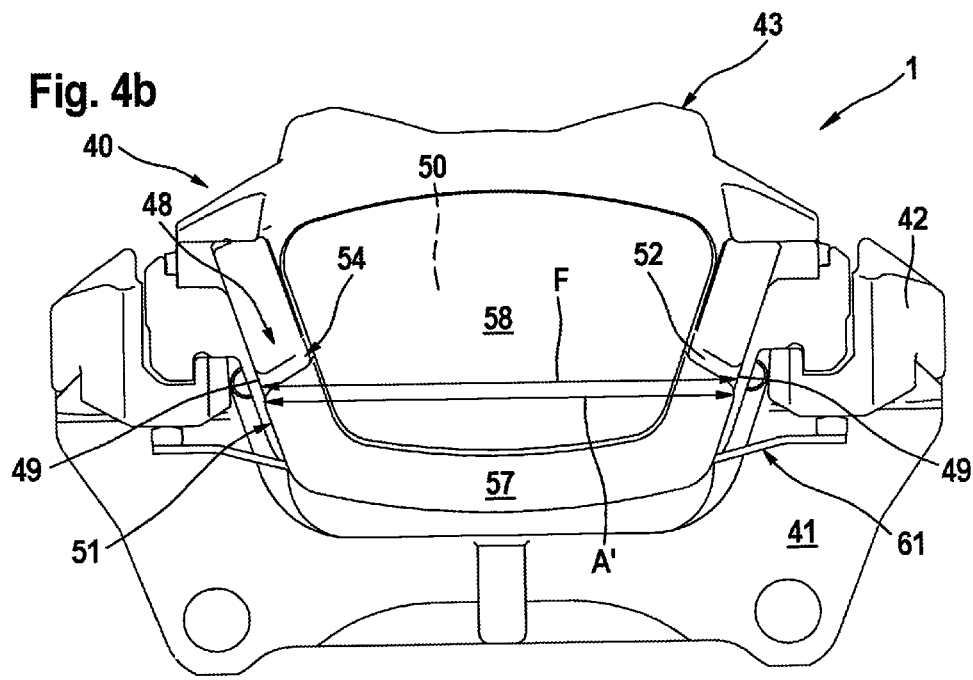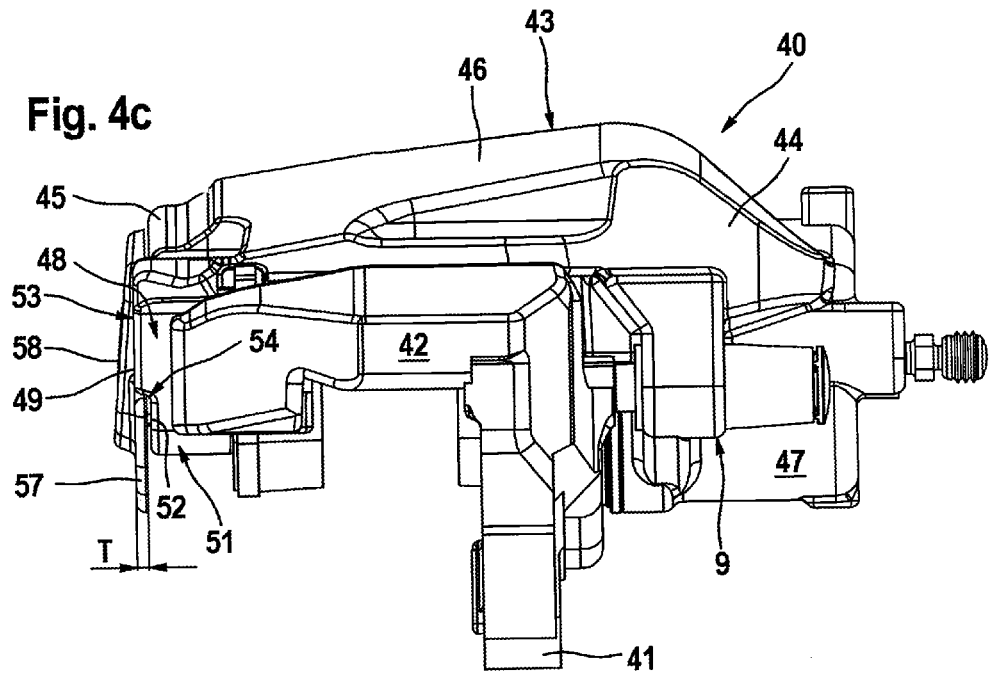

DISK BRAKE

CROSS REFERENCE TO RELATED APPLICATIONS

This application is the U.S. national phase application of PCT International Application No. PCT/EP2007/060740, filed Oct. 10, 2007, which claims priority to German Patent Application No. DE102006055717.4, filed Nov. 23, 2006 and German Patent Application No. DE102007033165.9, filed Jul. 17, 2007, the contents of such applications being incorporated by reference herein.

BACKGROUND OF THE INVENTION

1. Field of the Invention

The invention relates to a disk brake.

2. Description of the Related Art

The invention relates to a disk brake having at least one brake disk, which is mounted so as to be rotatable about a rotational axis, and having a brake caliper, which brake caliper has a bracket which is fixed with respect to the vehicle, a caliper housing and at least one brake lining. Here, the bracket and the caliper housing engage axially around the brake disk, with the caliper housing and the brake lining being mounted on the bracket so as to be movable in an axial direction. The caliper housing has an axially inner housing limb which faces toward the vehicle, an outer housing limb and a housing bridge. The outer housing limb comprises at least two housing fingers which run substantially in a radial direction and which span a limb window which is situated between them and which is open in the direction of the rotational axis, with the housing fingers having in each case one end section which faces toward the rotational axis.

A disk brake of said type is known from EP 1 143 163 A2. Here, it is possible to see the way in which the outer housing limb holds the outer brake lining by means of the housing fingers, and thereby provides a support surface for generating a normal force on the brake disk. The motivation for the design of the outer housing limb as a finger is that a considerable weight reduction is obtained in relation to a full, massive housing limb. Furthermore, the machining, in particular the cutting machining, of the inner side of the caliper housing takes place through the limb window between the housing fingers. Here, a tool, for example a drill or a milling cutter, is inserted between the housing fingers, with it being necessary for the limb window to have a radial opening in order to provide the required movement clearance for the tool, At present, the market is heavily influenced by the trend towards elegant brake calipers which are of harmonious and dynamic appearance. The wheel brake, which is clearly visible through wheel rims which are of ever more filigree design, must therefore be optimized in this respect. This often determines whether a product succeeds in a market. One method for meeting said demand is designing the gaping form of the caliper housing to be more uniform. In EP 1 143 163 A2, the discontinuous shape of the outer housing limb is obvious, in particular since, here, a spring arrangement braces a caliper housing of a brake caliper with respect to a bracket, and thereby prevents possible rattling of brake linings in the disk brake. Spring arrangements of said type generally engage on the outer surface of the outer caliper limb, and extend under the arms of the bracket. Said spring arrangements are susceptible to impacts and stone impacts.

SUMMARY OF THE INVENTION

It is an object of the invention to specify a disk brake which avoids the disadvantages of the prior art without thereby foregoing the positive aspects of the prior art.

The object is achieved in that a protective screen completely covers the end sections of the housing fingers and conceals a section, which faces toward the rotational axis, of the limb window, with an outer dimension of the protective screen in a circumferential direction being selected such that a transition between the protective screen and the housing fingers is substantially stepless in a circumferential projection. The design according to aspects of the invention has the effect that, firstly, the individual components of the wheel brake are protected, and that the housing fingers and the limb window are partially concealed. This has the result that the visual shape of the caliper housing is rounded and of more harmonious appearance, since in particular the housing fingers have assumed the shape of a circle. Here, the advantage of expedient access for a tool is not lost, since the protective screen is mounted only after the machining process. This would not be the case if the circular design of the outer housing limb were formed by means of a bridge connection formed in one piece with the housing fingers. Said disadvantageous option would be associated with an increase in weight and impaired producibility. In contrast, the design according to aspects of the invention has the double effect that no undesired particles, such as for example small stones, can become jammed in the region of the outer brake lining, in particular between the support surface and the back plate of the brake lining, since said undesired particles are deflected by the protective screen. Such objects would, in said regions, have a considerable adverse effect on the functionality of the wheel brake.

One expedient refinement of the invention provides that the protective screen has a U-shaped bend section which delimits the limb window in the radial direction. Here, it may expediently be provided that, at the transition between the protective screen and the housing fingers, an outer edge of the protective screen runs substantially parallel to an outer edge of the housing finger in a circumferential projection. As a result of the effective use of the described technical features, it is possible to solve the object of the invention of adapting the appearance of the wheel brake with regard to the trend toward elegance and visual harmony.

It is particularly advantageous if the transition is also of substantially stepless design in the axial direction. Here, an axial offset for holding the protective screen may be provided on the end sections of the housing fingers. By means of said technical features, the appearance of the brake caliper is optimized even in the axial direction.

The protective screen preferably has a central section which substantially conceals the limb window. The entire outer housing limb is thereby covered, since it is no longer possible to see into the limb window. In this way, the brake caliper is better protected against external mechanical effects. Here, it may be advantageous for the bend section and the central section not to be formed together in one piece, in particular if both sections are to be produced from different materials or in different colors. It would thus be possible, for example, to realize a standard design of the bend section which can be combined with a suitable central section according to the demand of the customer, or demand for personalization. The central section may carry a trademark, a name, an attractive graphic design or else may be provided with with functional features, such as for example illumination or reflective means. Alternatively, the protective screen, comprising the bend section and the central section, may be formed in one piece and therefore in a cost-effective manner.

In one embodiment of the invention, a spring arrangement for generating a preload force is provided between the bracket and the caliper housing. Said spring arrangement preferably engages into receptacles in the end sections of the housing fingers, and can thereby be fastened to the caliper housing. Here, it may be particularly expedient if the protective screen is attached to the spring element. In this way, the spring arrangement and protective screen may be pre-mounted or injection-molded on, and can be attached to the brake caliper in a simple and fast manner as one component. Alternatively, the protective screen and the spring arrangement can be fastened, with common connecting means, to the outer housing limb.

It is particularly expedient if connecting means are arranged on the protective screen, which connecting means engage into the housing fingers and fix the protective screen to the caliper housing. Connecting means of said type may be designed in the form of springs or latching mechanisms. Furthermore, recesses are preferably provided in the housing fingers, into which recesses the connecting means can engage, whereby the protective screen can be fastened to the outer housing limbs. The spring of the protective screen is advantageously formed with three spring arms, with two spring arms engaging into the recesses in the housing fingers, and with the third spring arm being supported on the spring arrangement.

These and other aspects of the invention are illustrated in detail by way of the embodiments and are described with respect to the embodiments in the following, making reference to the Figures.

BRIEF DESCRIPTION OF THE DRAWINGS

Further details of the invention can be gathered from the drawings on the basis of the description. In the drawings.

DETAILED DESCRIPTION OF THE PREFERRED EMBODIMENTS

Figure 1:
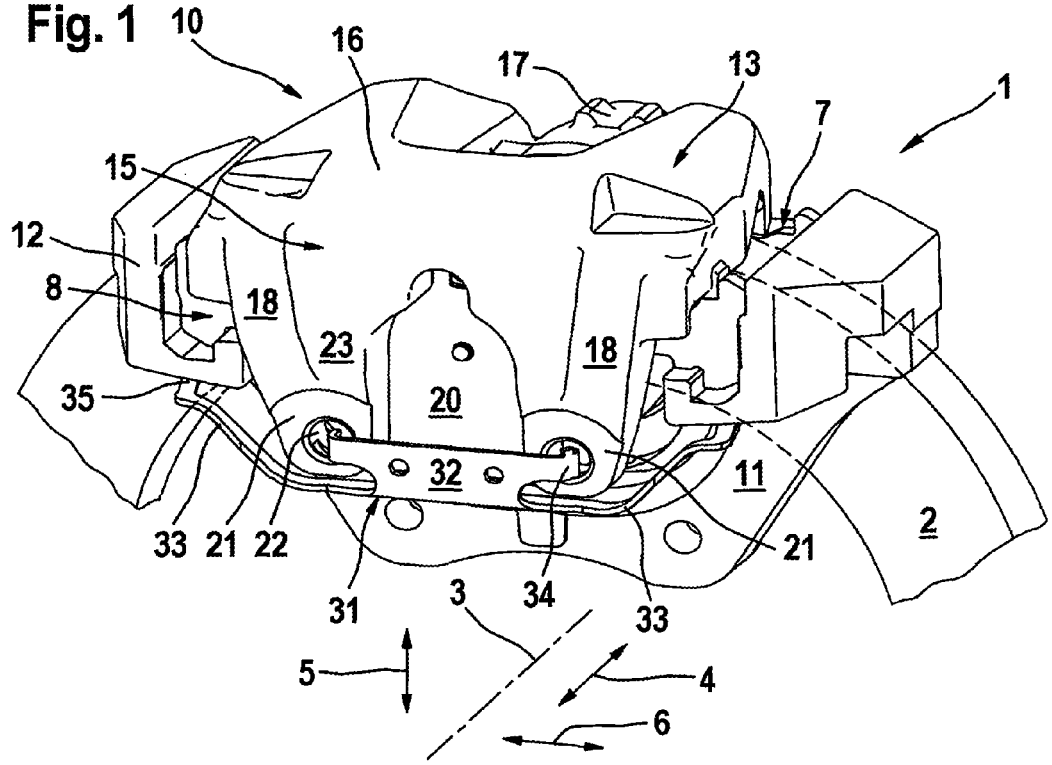
FIG. 1 shows a first embodiment of a brake caliper without a protective screen.
Figure 2:
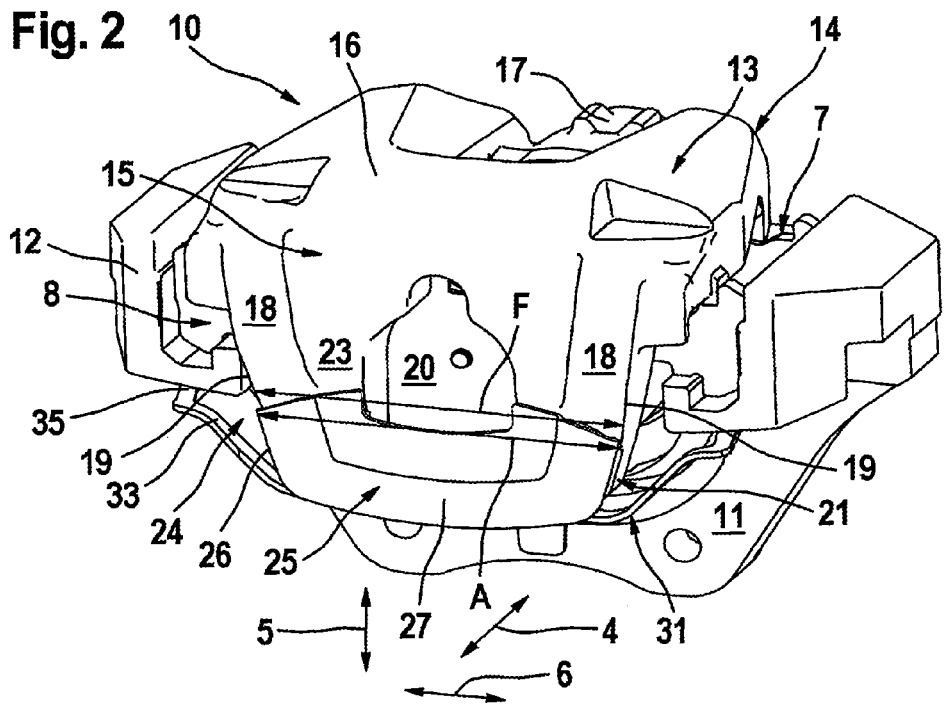
FIG. 2 show the brake caliper according to FIG. 1, with a protective screen which comprises only a bend section.
Figure 3:
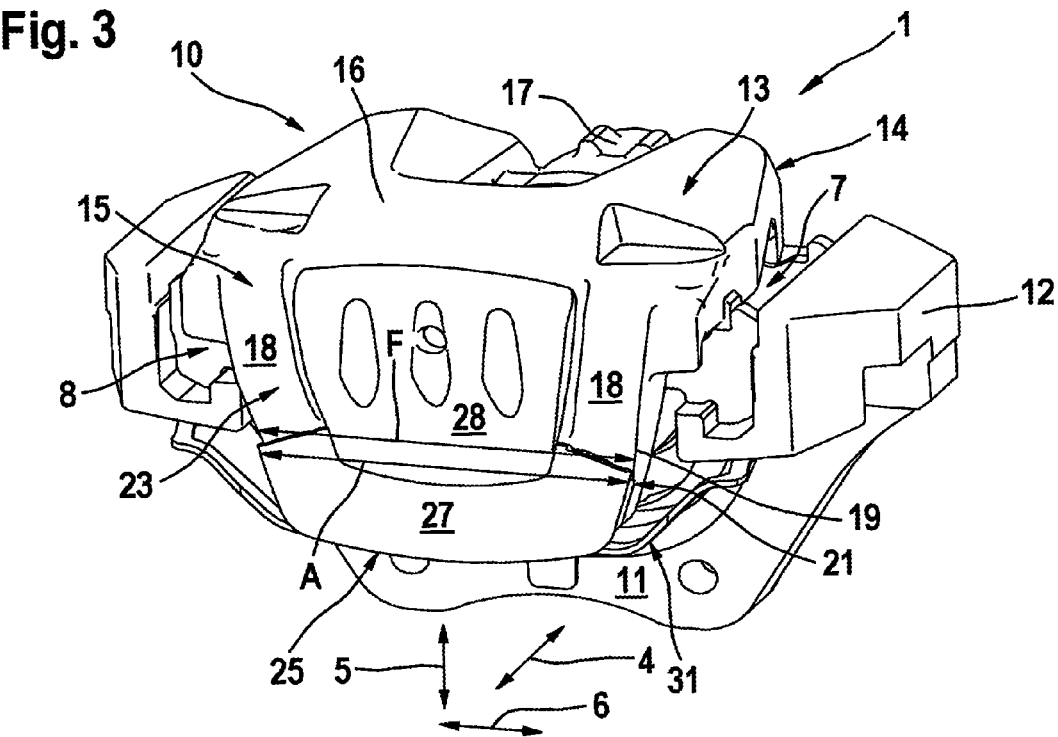
FIG. 3 shows the brake caliper according to FIG. 1 with a protective screen which comprises a bend section and a central section, FIG. 4a)-c) show different views of a further embodiment of a brake caliper with a protective screen, FIGS. 5a) and b) show an embodiment of the protective screen according to FIG. 4.

FIG. 1 to 4 show two embodiments of a brake caliper 10,40 of a disk brake 1, with FIG. 1 to 3 showing the first embodiment and FIG. 4 showing the second embodiment. In principle, both embodiments are of identical construction, wherein said embodiments differ with regard to the protective screens and geometric details. However, the following basic description applies to both embodiments. FIG. 1 shows a perspective view of a brake caliper 10 of a disk brake 1 with a caliper housing 13 and a vehicle-side bracket 11 without a protective screen. FIGS. 2 to 4 illustrate different protective screens 25, 25', 55, 55' mounted on the brake calipers 10,40.

The brake caliper 10,40 engages around a brake disk 2 which is mounted so as to be rotatable about the rotational axis 3. The axial direction 4, radial direction 5 and circumferential direction 6 are aligned in relation to the rotational axis 3. The caliper housing 13,43 comprises an axially inner housing limb 14,44 which comprises, inter alia, an actuating device 17,47 and, in the installed state, faces toward the vehicle. The caliper housing 13,43 also comprises a housing bridge 16,46 which connects an axially outer housing limb 15,45 to the inner housing limb 14,44. The outer housing limb 15,45 is designed at least partially in the form of two housing fingers 18,48 which span a limb window 20,50 which is situated between them and which is open in the direction of the rotational axis 3, with the housing fingers 18,48 having in each case one end section 21,51 which faces toward the rotational axis 3. The caliper housing 13,43 is mounted, by means of brake linings 7,8 and by means of pin guides 9, on bracket arms 12,42 of the bracket 11,41 so as to be movable in the axial direction 4. The brake linings 7,8 are provided in an axially movable fashion between the bracket arms 12,42 and the caliper housing 13,43. A spring arrangement 31,61 braces the caliper housing 13,43 against the bracket 11,41 via the brake linings 7,8. The spring arrangement 31,61 is produced from a metallic material, in particular punched out from a metal sheet and bent, and may be divided roughly into a fastening section 32,62 and two spring arms 33,63. It is also conceivable for the spring arrangement to be formed from bent spring wire. The fastening section 32,62 of the spring arrangement 31,61 is perpendicular to the spring arms 33,63 and nestles, in parallel, against outer surfaces 23,53 of the housing fingers 18,48 of the outer housing limb 15,45. Receptacles 22 are provided in the housing fingers 18,48, which receptacles 22 are engaged behind by fastening hooks 34,64 of the spring arrangement 31,61, as a result of which the spring arrangement 31,61 is fixed to the caliper housing 13,43. The spring arms 33,64 end in spherical spring heads 35,65 which press against bracket arms 12,42 of the bracket 11,41. A preload is thereby generated between the caliper housing 13,43 and the bracket 11,41.

Figure 7:
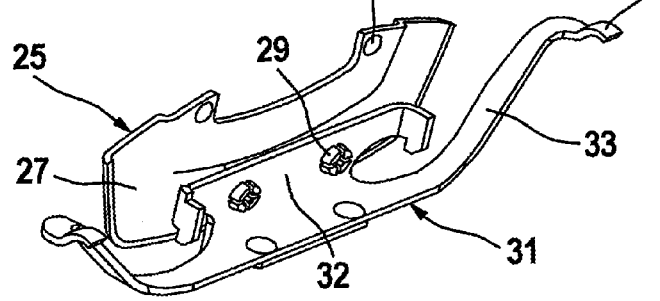
FIG. 7 shows the protective screen with a spring arrangement from FIGS. 2 and 3.

The basic function of the disk brake is as follows. The brake linings 7,8 are arranged between the caliper housing 13,43 and the bracket 11,41, with the spring arrangement 31,61 pressing the caliper housing 13,43 against the bracket 11,41 via the brake linings 7,8 in order to prevent noise being generated. If the brake is actuated, then a hydraulic pressure is built up in the actuating device 17,47, as a result of which a piston is pushed out of a cylinder. As a result, the brake lining 7 moves toward the brake disk 2 until said brake lining 7 bears against said brake disk 2. As a result, the actuating device 17,47 pushes the inner, piston-side housing limb 14 away from the brake disk 2 and, via the housing bridge 16, pulls the opposite, outer housing limb 15 in the direction of the associated side of the brake disk. In this way, the brake lining 8 is also pressed against the brake disk 2 and both brake linings 7,8 exert a normal force on parts of the running surfaces of the brake disk 2. A first embodiment of the protective screen 25, which is illustrated separately in FIG. 7, is described on the basis of FIG. 2. In said embodiment, the protective screen 25, designed in this case only as a U-shaped bend section 27, is connected to the spring arrangement 31. For this purpose, two bores are provided in the fastening section 32 of the spring arrangement 31, through which bores extend latching mechanisms 29 of the protective screen 25. The protective screen 25 can be clamped to the spring arrangement 31 in this way. The protective screen 25 thereby protects the brake caliper 10 from undesired influences and visually rounds the outer housing limbs 15, in that the two housing fingers 18 are visually connected. The limb window 20 remains open. The advantageous visual design of the brake caliper 10 with the protective screen 25 is obtained in that, at the transition 24 between the protective screen 25 and the housing fingers 18, the geometric dimensions of the two components are adapted to one another. Here, at the transition 24, the outer dimension A of the protective screen 25 in the circumferential direction 6 is of substantially equal magnitude to the spacing F of the tangential outer edges 19 of the two housing fingers 18. This results in a substantially stepless transition, in an axial projection, between the protective screen 25 and the outer housing limb 15. To further improve the visual and aesthetic quality of the brake caliper 10, the outer edges 26 of the protective screen 25 are also adapted, with regard to their alignment in the circumferential projection, to the tangential outer edges 19 of the two housing fingers 18. Here, the outer edges 26 of the protective screen 25 run, in a circumferential projection, substantially parallel to the tangential outer edges 19 of the housing fingers 18. In summary, this means that the contour line of the protective screen 25 merges, in the axial projection, into the contour line of the housing fingers 18 without a significant kink or offset.

The arrangement of the protective screen 25 on the spring arrangement 31 and on the caliper housing 13 is configured such that only a defined area of contact is generated between the bend section 27 and the housing fingers 18 via the projections 30. On account of the small and defined contact points, it is possible to prevent rattling noises from being generated. Under some circumstances, it may however be more advantageous for the protective screen to be supported exclusively on the spring arrangement, and to avoid direct contact with the housing fingers.

FIG. 3 shows the brake caliper 10 from FIG. 2, with the protective screen 25' being connected to the spring arrangement 31 and also comprising a central section 28 in addition to the bend section 27. Said central section 28 covers the limb window 20, as a result of which the brake caliper 10 is better protected and also has a more compact and harmonious appearance. In the present embodiment, the bend section 27 and the central section 28 are formed as different components. This has the advantage that different materials can be used. It is conceivable for the bend section 27 to be formed as a standard component without an option for personalization, whereas the central section 28 may be adapted in a customer-specific manner with regard to the color, the material or the surface properties. The central section 28 can be latched, by way of latching means, directly into recesses in the outer housing limb 15.

As an alternative to the design of the protective screen from FIG. 3 and FIG. 7, a further embodiment of a protective screen 55 is introduced on the basis of a brake caliper 40 shown in FIG. 4. Said protective screen 55 comprises a U-shaped bend section 57 and a central section 58 and is formed in one piece as one component. Said protective screen 55 improves the visual design of the brake caliper 40 firstly in that, at the transition 54 between the protective screen 55 and the housing fingers 48, the outer dimension A' of the protective screen 55 in the circumferential direction 6 is of substantially the same magnitude as the spacing F of the tangential outer edges 49 of the two housing fingers 48. Furthermore, the outer edges 56 of the protective screen 55 run, in a circumferential projection, substantially parallel to the tangential outer edges 49 of the housing fingers 48. The adaptation of the geometries of the protective screen 55 and of the housing fingers 48 at the transition has the effect that the contour line of the protective screen 55 or of the U-shaped bend section 57 merges, in a circumferential projection, into the contour line of the housing fingers 48 without a significant kink or offset.

Figure 4A:
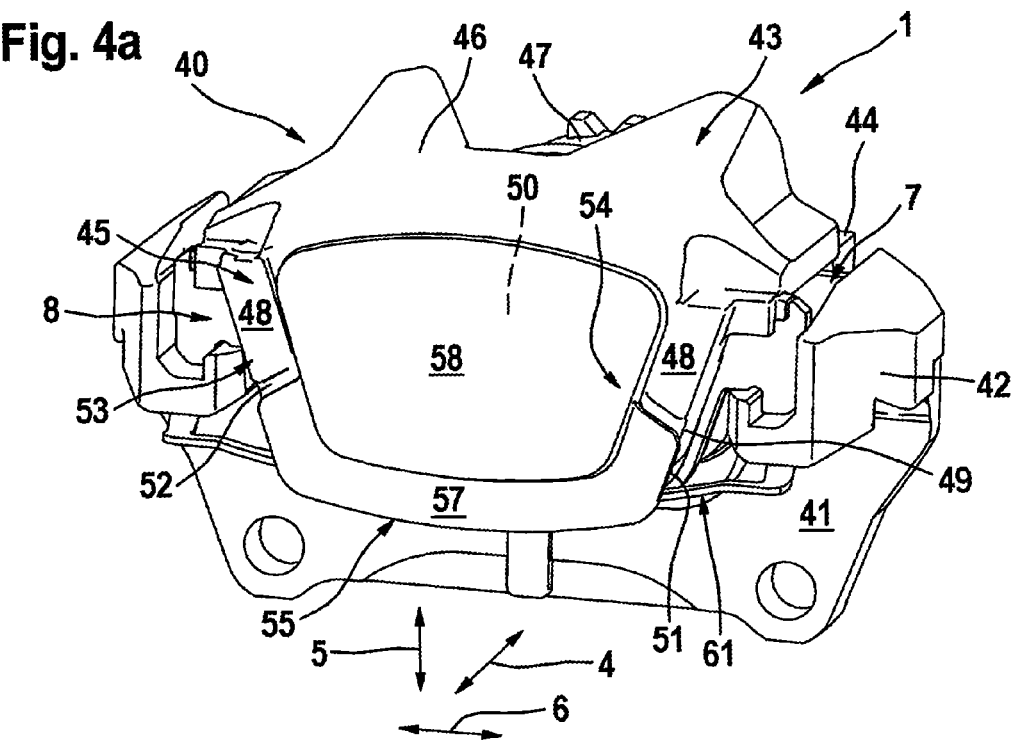

Further visual and aesthetic optimization is obtained by means of the technical features shown in FIG. 4a and in particular in FIG. 4c. For this purpose, an axial offset 52 for holding the protective screen 55, in particular the bend section 57, is provided on the end sections 51 of the housing fingers 48. This has the effect that the transition 54 between the protective screen 55 and the housing fingers 48 is of substantially stepless design in the axial direction 4. This is to be clarified on the basis of FIG. 4c. The offset 52 in the end sections 51 of the housing fingers 48 is obtained in that the end sections 51 are designed to be narrower in the axial direction 4 than the rest of the housing fingers 48, such that the housing fingers 48 have a step at their end section 51 facing toward the rotational axis 3. Said step compensates the thickness T of the bend section 57 in the region of overlap of the bend section 57 and the end sections 51, such that the overall surface formed by the housing fingers 48 and the bend section 57 is formed so as to be substantially planar, that is to say without a step or a kink, in the axial direction 4. It is pointed out that small gaps or small geometric non-uniformities may self-evidently be formed, but these are considered not to be significant or relevant to the invention.

Figure 5A:
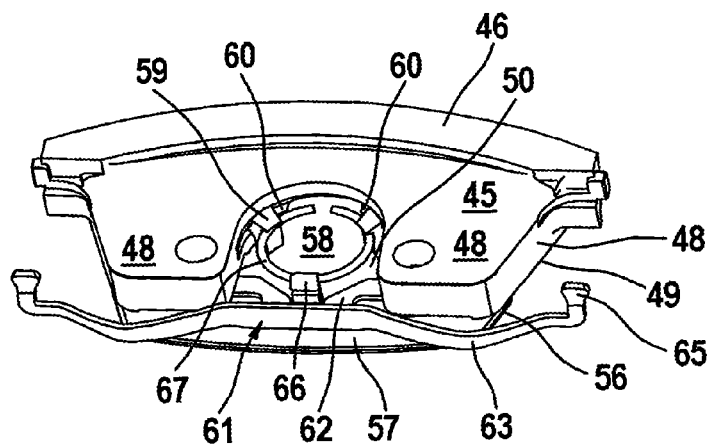
Figure 5B:
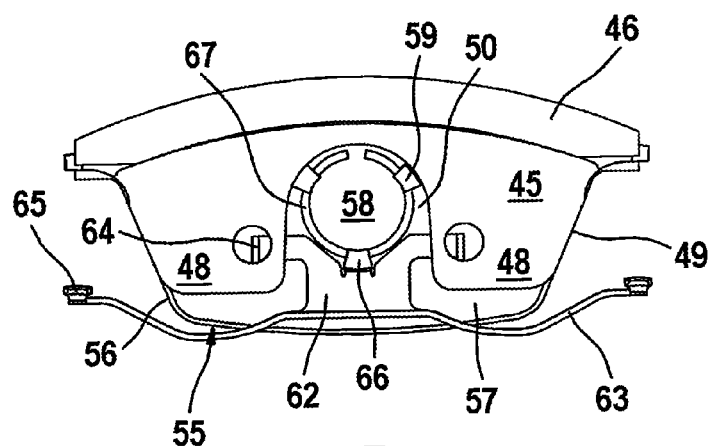

FIGS. 5a and b show the outer housing limbs 44 as viewed from the perspective of the inner housing limb 45. Here, one embodiment of the protective screen 55 from FIG. 4 is illustrated, with the projective screen 55 and the spring arrangement 61 being arranged, with common connecting means, on the outer housing limb 44. The protective screen 55 comprises the central section 58 and the bend section 57. The spring arrangement 61 has a fastening section 62 with fastening hooks 64 and spring arms 63 with spring heads 65. Also provided on the fastening section 62 is a spring latching mechanism 66 which, in interaction with a spring ring 67 and with screen latching mechanisms 59, detachably fixes the spring arrangement 61 and the protective screen 55 to the housing limb 44. For this purpose, recesses 60 are formed in the housing limb 44, into which recesses 60 the screen latching mechanisms 59 engage under preload and thereby fasten the spring ring 67 to the housing limb 44. The spring latching mechanism 66 also engages behind the spring ring 67, whereby the spring arrangement 61 is supported axially. Also conceivable is a reversed arrangement, in which the spring arrangement is fixed axially in the receptacles in the end sections of the housing fingers, and the spring latching mechanism serves to axially support the spring ring and the protective screen. It is also conceivable for a wire or plate spring to be provided on the protective screen 55, which wire or plate spring engages under preload into the recesses 60 and fixes the protective screen 55 to the housing fingers 45. Said wire or plate spring may optionally be supported partially in the recesses 60 and on the fastening section 62 of the spring arrangement 61. A spring of said type is designed such that it can be plugged onto the protective screen, or is connected directly to the protective screen 55 by injection molding.

Figure 6:
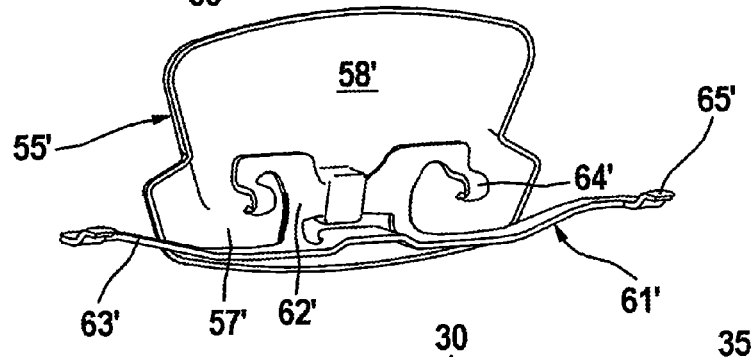
FIG. 6 shows a further embodiment of the protective screen according to FIG. 4.

FIG. 6 shows an expedient design of a protective screen 55' and of the spring arrangement 61', with the protective screen 55' comprising the central section 58' and the bend section 57' in one piece. In FIG. 6, elements 61', 62', 63', 64', and 65' correspond to elements 61, 62, 63, 64, and 65 in FIGS. 5a and b. Here, the protective screen 55' is formed around the spring arrangement 61' by primary forming. It is also conceivable for the protective screen to be formed from plastic and injection-molded onto the spring arrangement The different embodiments of the protective screen 25, 25', 55, 55' are preferably produced from a plastic. Also conceivable are metal and sheet-metal designs, in particular when the bend section and the central section are formed as different components. With regard to the mechanical and visual properties, it is particularly expedient to use fibrous and composite materials, such as for example carbon fiber structures or the like.

The features illustrated in the figures may also be combined with one another, and are not restricted to the individual exemplary embodiments.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A disk brake for a vehicle comprising:
at least one brake disk, which is mounted so as to be rotatable about a rotational axis;
a brake caliper associated with the brake disk, said brake caliper including a bracket which is fixed with respect to the vehicle, a caliper housing and at least one brake lining, the bracket and the caliper housing engaging axially around the brake disk, the caliper housing and the brake lining being mounted on the bracket so as to be movable in an axial direction;
said caliper housing having an axially inner housing limb which faces toward the vehicle, an outer housing limb and a housing bridge, the outer housing limb comprising at least two housing fingers which extend in a substantially radial direction, the housing fingers spanning a limb window which is situated between the housing fingers, the limb window is open in the direction of the rotational axis, each housing finger having one end section which faces toward the rotational axis;
a spring arrangement for generating a preload force that is positioned between the bracket and the caliper housing; and
a protective screen that at least partially covers the spring arrangement, completely covers the end sections of the housing fingers, and conceals a section that faces toward the rotational axis of the limb window, wherein an outer dimension of the protective screen in a circumferential direction is substantially equal to a spacing between outer edges of the housing fingers such that a transition between the protective screen and the housing fingers is substantially stepless in a circumferential projection.

2. The disk brake as claimed in claim 1, wherein the protective screen has a U-shaped bend section which delimits the limb window in the radial direction.

3. The disk brake as claimed in claim 1, wherein, at the transition, an outer edge of the protective screen extends substantially parallel to an outer edge of the housing finger in a circumferential projection.

4. The disk brake as claimed in claim 1, wherein the transition is of substantially stepless design in the axial direction.

5. The disk brake as claimed in claim 4, wherein each housing finger comprises a first axial surface and the end section of each housing finger comprises a second axial surface having an axial offset relative to the first axial surface, the protective screen contacting the second axial surface of the end sections of the housing fingers in order to achieve the substantially stepless design in the axial direction.

6. The disk brake as claimed in claim 1, wherein the protective screen has a central section which substantially conceals the limb window.

7. The disk brake as claimed in claim 6, wherein the protective screen, comprising the bend section and the central section, is formed in one piece.

8. The disk brake as claimed in claim 1, wherein a receptacle, into which the spring arrangement engages, is provided in the end sections of the housing fingers.

9. The disk brake as claimed in claim 1, wherein the protective screen is arranged on the spring arrangement.

10. The disk brake as claimed in claim 1, wherein the protective screen and the spring arrangement are arranged, with common connecting means, on the outer housing limb.

11. The disk brake as claimed in claim 1, wherein connecting means are arranged on the protective screen, which connecting means engage into the housing fingers and fix the protective screen to the caliper housing.

* * * * *